United States Patent
Kishi et al.

(10) Patent No.: US 7,825,634 B2
(45) Date of Patent: Nov. 2, 2010

(54) CHARGE ACCUMULATING SYSTEM AND CHARGE ACCUMULATING METHOD

(75) Inventors: Takashi Kishi, Yokosuka (JP); Takashi Kuboki, Tokyo (JP); Tsuyoshi Kobayashi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 443 days.

(21) Appl. No.: 11/464,396

(22) Filed: Aug. 14, 2006

(65) Prior Publication Data

US 2007/0059587 A1    Mar. 15, 2007

(30) Foreign Application Priority Data

Sep. 12, 2005    (JP) .............................. 2005-264028

(51) Int. Cl.
*H02J 7/04*    (2006.01)
*H02J 7/16*    (2006.01)

(52) U.S. Cl. ...................... 320/150; 320/144; 320/153; 320/137

(58) Field of Classification Search ................. 320/127, 320/128, 134, 135, 136, 137, 150, 152, 160, 320/162, 144, 153

See application file for complete search history.

(56) References Cited

U.S. PATENT DOCUMENTS

| | | | | |
|---|---|---|---|---|
| 5,808,446 | A | * | 9/1998 | Eguchi ........................ 320/134 |
| 6,121,751 | A | * | 9/2000 | Merritt ........................ 320/116 |
| 2002/0195999 | A1 | * | 12/2002 | Kimura et al. ............... 320/134 |
| 2003/0057918 | A1 | * | 3/2003 | Aoki et al. ................... 320/136 |
| 2005/0164082 | A1 | * | 7/2005 | Kishi et al. .................. 429/188 |
| 2006/0068282 | A1 | | 3/2006 | Kishi et al. |

FOREIGN PATENT DOCUMENTS

| | | | |
|---|---|---|---|
| CN | 1433121 | A | 7/2003 |
| JP | 9-289741 | | 11/1997 |
| JP | 2000-209782 | | 7/2000 |
| JP | 2002-51478 | | 2/2002 |
| JP | 2002-051478 | A * | 2/2002 |
| JP | 2003-219573 | A * | 7/2003 |
| JP | 2004-15876 | | 1/2004 |
| JP | 2004-015876 | A * | 1/2004 |
| JP | 2004-87319 | | 3/2004 |
| JP | 2005-20955 | | 1/2005 |
| JP | 2005-243620 | | 9/2005 |

OTHER PUBLICATIONS

U.S. Appl. No. 12/033,304, filed Feb. 19, 2008, Kishi, et al.
U.S. Appl. No. 11/276,843, filed Mar. 16, 2006, Takashi Kuboki, et al.
U.S. Appl. No. 11/337,513, filed Jan. 24, 2006, Hidesato Saruwatari.

* cited by examiner

*Primary Examiner*—Edward Tso
*Assistant Examiner*—Ahmed Omar
(74) *Attorney, Agent, or Firm*—Oblon, Spivak, McClelland, Maier & Neustadt, L.L.P.

(57) ABSTRACT

A charge accumulating system of the present invention comprises a nonaqueous electrolyte battery unit including a nonaqueous electrolyte containing an ionic liquid, a negative electrode and a positive electrode, a temperature detector which detects an ambient temperature of the battery unit, a first controller which lowers a maximum battery voltage of the battery unit when the detected temperature from the temperature detector exceeds a standard ambient temperature, and a second controller which controls a maximum charging amount $Q_{max}$ of the nonaqueous electrolyte battery unit at a constant level, or lowers the maximum charging amount $Q_{max}$ when the detected temperature from the temperature detector exceeds the standard ambient temperature.

8 Claims, 2 Drawing Sheets

CHARGE ACCUMULATING SYSTEM AND CHARGE ACCUMULATING METHOD

CROSS-REFERENCE TO RELATED APPLICATIONS

This application is based upon and claims the benefit of priority from prior Japanese Patent Application No. 2005-264028, filed Sep. 12, 2005, the entire contents of which are incorporated herein by reference.

BACKGROUND OF THE INVENTION

1. Field of the Invention

The invention relates to a charge accumulating system and a charge accumulating method of a nonaqueous electrolyte battery.

2. Description of the Related Art

Nonaqueous electrolyte batteries for charging and discharging due to lithium ions moving between a negative electrode and a positive electrode have been intensively researched and developed as high energy density batteries. Recently, such nonaqueous electrolyte batteries are being demanded to be improved in high temperature properties such as stability, cycle characteristic, and storage performance in a high temperature environment, aside from enhancement of the energy density required so far.

At the present, a nonaqueous electrolyte used in a nonaqueous electrolyte battery is generally a nonaqueous electrolyte of an organic solvent system obtained by dissolving an electrolyte in an organic solvent. Since the organic solvent is combustible and volatile, various safety devices are provided from the viewpoint of enhancement of safety, which are factors for lowering the volume energy density.

It has been proposed to improve the high temperature characteristics of a nonaqueous electrolyte by using an ionic liquid which is noncombustible and nonvolatile without using the organic solvent. The ionic liquid is a kind of salt composed of cations and anions and exists in a liquid state at room temperature. The ionic liquid is strong in ion bonding property, and is hence nonvolatile and noncombustible.

JP-A 2004-015876 (KOKAI) discloses a nonaqueous electrolyte battery of an organic solvent system, in which the cycle performances are improved by setting low a charge voltage along with elevation of temperature.

BRIEF SUMMARY OF THE INVENTION

A charge accumulating system of the present invention comprises: a nonaqueous electrolyte battery unit comprising a nonaqueous electrolyte containing an ionic liquid, a negative electrode and a positive electrode; a temperature detector which detects an ambient temperature of the nonaqueous electrolyte battery unit; first control means for lowering a maximum battery voltage of the nonaqueous electrolyte battery unit when the detected temperature from the temperature detector exceeds a standard ambient temperature; and second control means for controlling a maximum charging amount of the nonaqueous electrolyte battery unit at a constant level, or lowering the maximum charging amount when the detected temperature from the temperature detector exceeds the standard ambient temperature.

A charge accumulating method of the present invention comprises: providing a nonaqueous electrolyte battery unit including a nonaqueous electrolyte containing an ionic liquid, a negative electrode and a positive electrode; detecting an ambient temperature of the nonaqueous electrolyte battery unit; lowering a maximum battery voltage of the nonaqueous electrolyte battery unit when the detected temperature exceeds a standard ambient temperature; and controlling a maximum charging amount of the nonaqueous electrolyte battery unit at a constant level, or lowering the maximum charging amount when the detected temperature exceeds the standard ambient temperature.

DETAILED DESCRIPTION OF THE INVENTION

Embodiments of the invention will be described below with reference to the accompanying drawings.

A behavior of a nonaqueous electrolyte battery using an ionic liquid along with ambient temperature changes will be explained.

The ionic liquid is lowered in viscosity when the ambient temperature becomes higher than room temperature (not lower than 20° C. and not higher than 30° C.), and the degree of ion dissociation is increased. Consequently, utilization gradation in an electrode film thickness direction varies due to changes in degree of impregnation of the ionic liquid in an electrode layer, and a state of charge (SOC) of an active material is increased and various reaction potentials are changed. As a result, the capacity balance of a positive electrode and a negative electrode is broken, lithium intercalation and deintercalation characteristics of the active material itself deteriorate, impedances are changed in parts inside the nonaqueous electrolyte battery such as a potential difference in the electrode thickness direction, and cycle performances deteriorate. Such changes are obvious when the ambient temperature exceeds room temperature (not lower than 20° C. and not higher than 30° C.), and more prominent when exceeding 60° C.

This phenomenon degrades the features of the ionic liquid which is noncombustible, nonvolatile, and excellent, in principle, in high temperature characteristics. Usually, the nonaqueous electrolyte battery is designed and manufactured to be used at the room temperature, and this problem cannot be avoided.

In the specification, the term "standard ambient temperature" refers to the temperature of the handling environment of the nonaqueous electrolyte battery, that is, room temperature. The room temperature is defined in a range of not lower than 20° C. and not higher than 30° C.

Now, a behavior of a nonaqueous electrolyte battery using an organic solvent along with ambient temperature changes will be explained.

Generally, the organic solvent is sufficiently low in viscosity at room temperature, and is high in degree of ion dissociation. Hence, as compared with the ionic liquid, the organic solvent is extremely low rate of decline of viscosity or degree of ion dissociation due to elevation of the ambient temperature. Therefore, deterioration of cycle performances due to such causes is not so serious.

In a general organic solvent, when the ambient temperature exceeds 60° C., the organic solvent itself is evaporated. Due to generation of gas, the internal resistance increases or internal pressure elevates. Accordingly, the problem of safety is more serious than the problem of deterioration of cycle performances, therefore, the nonaqueous electrolyte battery is not supposed to be used at such a high temperature.

In the nonaqueous electrolyte battery comprising the nonaqueous electrolyte containing the ionic liquid, the behavior due to elevation of the ambient temperature is more complicated as compared with the organic solvent system as discussed above. For example, at the ambient temperature exceeding 150° C., reaction of an electrode member or a current collector with an ionic liquid electrolyte cannot be ignored, and sufficient performance as a battery may not be exhibited. Moreover, when the ambient temperature exceeds 150° C., a resin cannot be used in an insulating material since the resin is likely to be dissolved or softened, and consequently, a battery having an ionic liquid effectively insulated and sealed therein cannot be composed. Hence, in the charge accumulating system of the invention, the upper limit of the ambient temperature is 150° C. In the embodiment, therefore, both a control about a maximum battery voltage and a control about a maximum charging amount are employed to enhance the cycle performances of the nonaqueous electrolyte battery.

Figure 1:
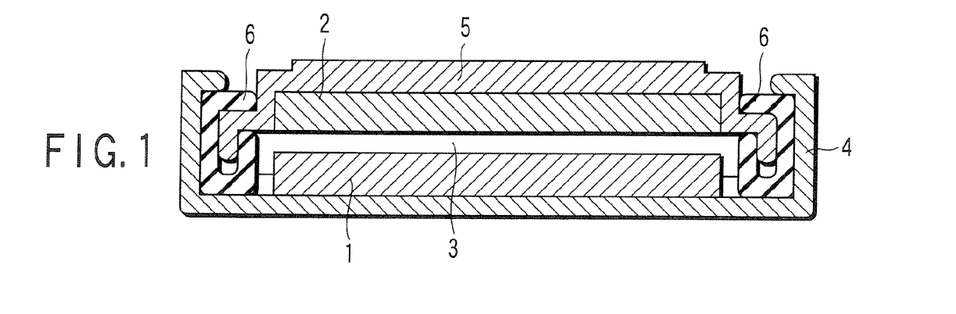
FIG. 1 is a schematic sectional view of a coin type battery for use in a charge accumulating system according to an embodiment of the present invention.
Figure 2:
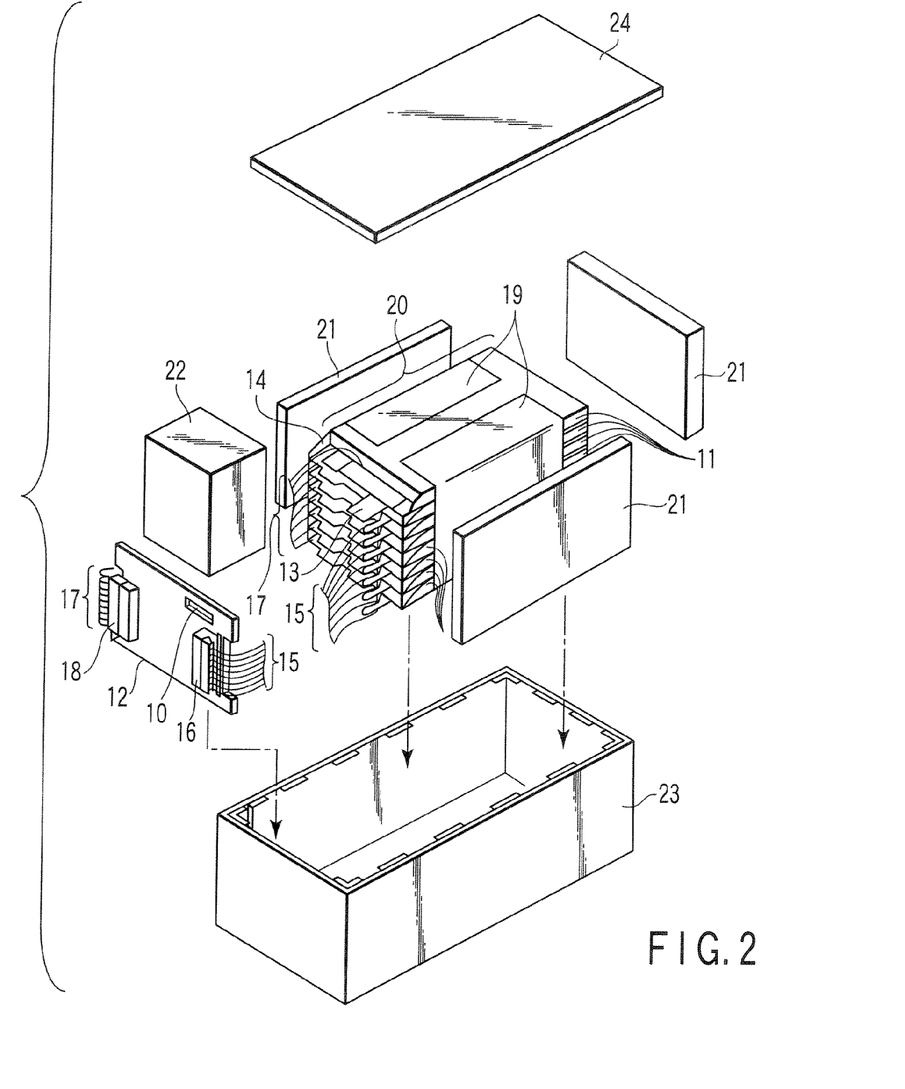
FIG. 2 is an exploded perspective view of a battery pack for use in a charge accumulating system according to an embodiment of the invention.
Figure 3:
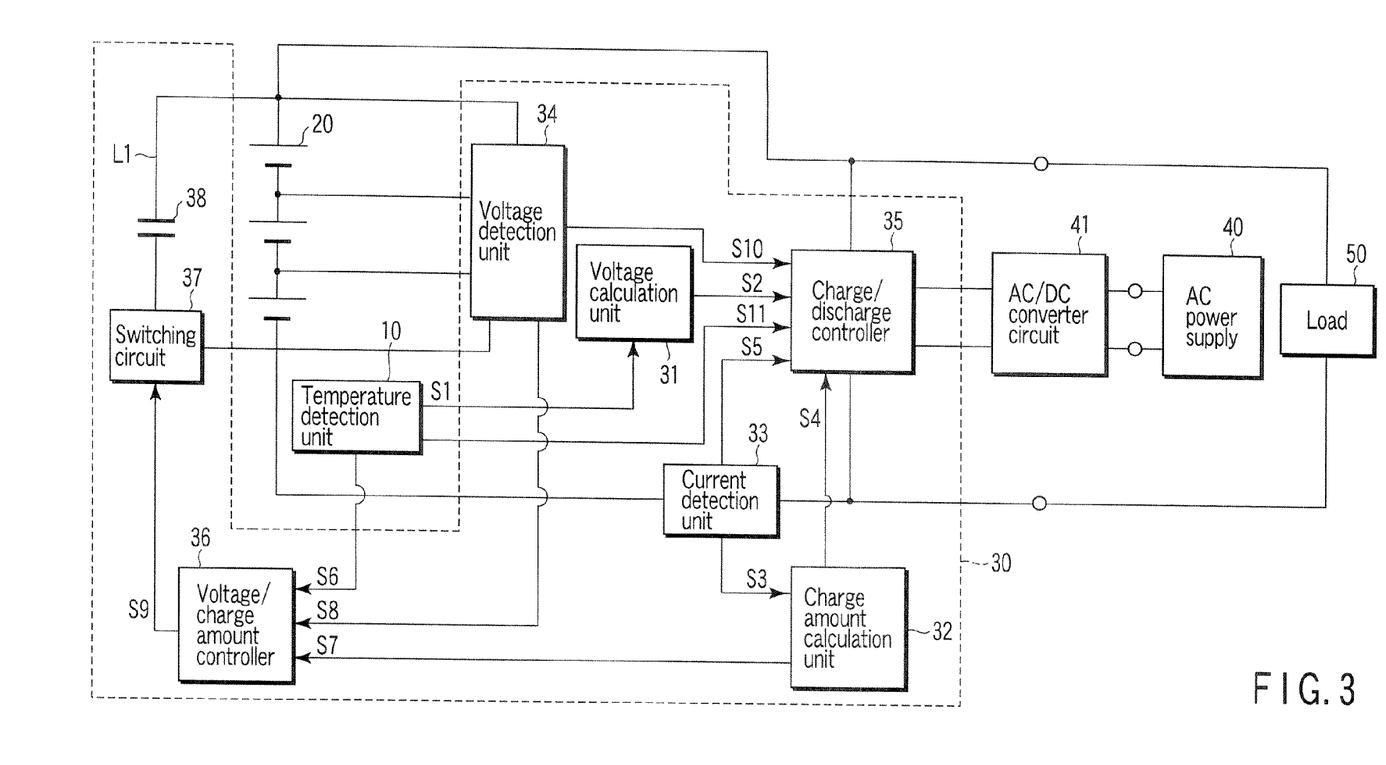
FIG. 3 is a control block diagram of a charge accumulating system according to an embodiment of the invention.

With reference to FIGS. 1 to 3, a configuration and a function of the charge accumulating system according to the embodiment will be explained.

The charge accumulating system of the embodiment comprises a nonaqueous electrolyte battery unit 20, a temperature detector 10, and a charge and discharge controller 35. The nonaqueous electrolyte battery unit 20 has a nonaqueous electrolyte 3 containing an ionic liquid, a negative electrode 2 and a positive electrode 1. The temperature detector 10 detects the ambient temperature of the nonaqueous electrolyte battery unit 20. The charge and discharge controller 35 charges the nonaqueous electrolyte battery unit 20 in accordance with a maximum battery voltage and a maximum charging amount based on a detected temperature T from the temperature detector 10.

A battery pack of the charge accumulating system has a protective circuit 30. The protective circuit 30 includes a voltage calculator 31, a charging amount calculator 32, a current detector 33, a voltage detector 34, the charge and discharge controller 35, the voltage and charging amount controller 36, and the like.

The nonaqueous electrolyte battery unit 20 is composed of a single nonaqueous electrolyte battery or a battery module having a plurality of nonaqueous electrolyte batteries 11 connected in series or in parallel. The nonaqueous electrolyte battery unit 20 is connected to an AC/DC converter circuit 41 serving as a power source from outside and an external load 50 through the charge and discharge controller 35.

Further, the temperature detector 10 having a thermocouple and the like is attached to the nonaqueous electrolyte battery unit 20, and the temperature of the surrounding environment of the nonaqueous electrolyte battery unit 20 can be detected whenever desired. The temperature detector 10 sends out temperature detection signals S1 and S11 to the voltage calculator 31.

The voltage calculator 31 calculates a maximum charge voltage from the temperature detection signal S1, and sends the determined charge voltage signal S2 to the charge and discharge controller 35.

The charging amount calculator 32 receives a signal S3 from the current detector 33, integrates the currents on the basis of the current detection signal S3, determines a charging amount, and sends the determined charging amount signal S4 to the charge and discharge controller 35.

The charge and discharge controller 35 determines the maximum battery voltage and the maximum charging amount from the charge voltage signal S2, charging amount signal S4, temperature detection signal S11, current detection signal S5 and voltage detection signal S10, and charges the nonaqueous electrolyte battery unit 20 by use of input from the AC/DC converter circuit 41.

A scheme of charging the nonaqueous electrolyte battery unit 20 is not particularly limited, and includes CC charge, CV charge, CCCV charge, termination of charging when reaching a specified current by CCCV charge, and many others. Herein, the term "CC charge" refers to constant current charge for charging until reaching a specified voltage, and the term "CV charge" refers to constant voltage charge for charging at a specified voltage. The term "CCCV charge" refers to a combining charging method of CC charge and CV charge. In CCCV charge, first reaching a specified voltage by CC charge, CV charge continues for a specific time at a specified voltage.

To increase the capacity of the nonaqueous electrolyte battery unit 20 as much as possible, the CCCV charge is preferred. To extend the cycle life by reducing the load to the battery electrodes, it is preferred to perform CCCV charge, and terminate charging when reaching a specified current.

The operation will be specifically described with respect to control means about the maximum battery voltage (first control means), control means about the maximum charging amount (second control means), temperature detector, and nonaqueous electrolyte battery unit.

(Control Means about Maximum Battery Voltage; First Control Means)

Control means about the maximum battery voltage corresponds to the charge and discharge controller 35 shown in FIG. 3. That is, when the detected temperature T exceeds a standard ambient temperature $T_{std}$, the maximum battery voltage $E_{max}$ of the nonaqueous electrolyte battery unit 20 (nonaqueous electrolyte battery or battery module) is lowered. The term "detected temperature" refers to the temperature of the surrounding environment of the nonaqueous electrolyte battery unit 20 detected by the temperature detector 10.

The maximum battery voltage $E_{max}$ determines maximum and minimum potentials applied to the positive electrode and negative electrode. Accordingly, various changes due to changes of the ambient temperature described above can be reduced, and the cycle characteristics of the nonaqueous electrolyte battery can be enhanced.

In the case of CC charge and CV charge, the maximum battery voltage $E_{max}$ refers to the specified voltage mentioned above. In the case of CCCV charge, the maximum battery voltage $E_{max}$ refers to a terminal voltage in constant current charge, and a specified voltage (constant voltage) in the successive constant voltage charge. In the case of other charge, it refers to the maximum battery voltage applied to the battery from outside of the battery during charging.

The standard maximum battery voltage $E_{std}$ refers to a maximum battery voltage at a standard temperature (standard ambient temperature) at which the nonaqueous electrolyte battery is assumed to be used. This standard ambient temperature is set at room temperature, that is, in a range of from 20° C. to 30° C. Note that the standard ambient temperature is often set at a specific temperature, such as 20° C. or 25° C.

The standard maximum battery voltage $E_{std}$ is determined depending on cathode and anode active materials, and the state of charge (SOC) and depth of discharge (DOD) suited for use thereof. For example, in the case of a nonaqueous electrolyte battery using $LiCoO_2$ in a positive electrode and graphite in a negative electrode, usually, $E_{std}$ is set at 4.2 V. However, in the application where safety or storage performance is more important than the discharge capacity, $E_{std}$ may be set at 4.15 V or 4.1 V. In a nonaqueous electrolyte battery using $LiCoO_2$ in a positive electrode and lithium titanate in a negative electrode, $E_{std}$ is set at 2.8 V or 2.7 V. Depending on the application of the nonaqueous electrolyte battery, $E_{std}$ may be set at other values.

The maximum battery voltage $E_{max}$ varies depending on the ambient temperature of the nonaqueous electrolyte battery unit 20 in a range not higher than the standard maximum battery voltage $E_{std}$. An ambient temperature of the battery unit 20 is detected by the temperature detector 10, and the maximum battery voltage $E_{max}$ can be determined depending on the detected temperature. Specifically, the charge and discharge controller 35 determines the maximum battery voltage $E_{max}$ on the basis of the input signals S2, S5, S10 and S11 and the following formulas (1-1) to (1-4) and performs control. The signal S2 is a charge voltage signal determined by the voltage calculator 31 on the basis of the temperature detection signal S1 inputted in the voltage calculator 31 from the temperature detector 10. The signal S5 is a current detection signal to be inputted in the controller 35 from the current detector 33. The signals S8 and S10 are a voltage detection signal to be inputted in the controller 35 from the voltage detector 34 (signal obtained by detecting the voltage of the unit 20). The signal S11 is a temperature detection signal to be inputted in the controller 35 from the temperature detector 10:

$$E_{max} = E_{std} - \alpha(T - T_{std}) \quad (1\text{-}1)$$

$$T_{std} \leq T \leq 150 \quad (1\text{-}2)$$

$$20 \leq T_{std} \leq 30 \quad (1\text{-}3)$$

$$0.001 \leq \alpha \leq 0.004 \quad (1\text{-}4)$$

where $E_{max}$ denotes a maximum battery voltage (V); $E_{std}$ denotes a standard maximum battery voltage (V); T denotes a detected temperature (° C.); $T_{std}$ denotes a standard ambient temperature (° C.); and $\alpha$ denotes a coefficient.

An optimum maximum battery voltage varies with various elements, such as types of cathode and anode active materials, an electrode composition of a filler and conductive aid, electrode filling density, a material and porosity of a separator, type of an ionic liquid, and alkaline metal salt or alkaline earth metal salt concentration. Generally, sufficient effects are obtained when the maximum battery voltage $E_{max}$ is controlled by the formulas (1-1) to (1-4).

Coefficient $\alpha$ is 0.0005 or more, and the cycle performances can be enhanced. However, when charge and discharge are repeated or when accumulated in a charged state, the effect is not obtained unless it is 0.001 or more. Preferably, when the coefficient $\alpha$ is set to not less than 0.001 and not more than 0.004, the cycle performances can be enhanced, and excessive lowering of the battery capacity can be suppressed. When the standard maximum battery voltage is 2 to 3 V, it is particularly preferred to define the coefficient $\alpha$ in a range from 0.002 to 0.003. If the coefficient $\alpha$ is not lower than 0.004, the potential difference to be pulled down is too much as the temperature becomes higher, and effects of improving the cycle performances are not expected. It means that the charging amount is decreased in CC charge, and the CV charging time is long in CCCV charge, and the electrode load is increased so that deterioration of cycle characteristics is increased.

Different from the nonaqueous electrolyte battery of an organic solvent system, in the nonaqueous electrolyte battery of an ionic liquid system, the value of the coefficient $\alpha$ is not preferred to be 0.005 or more even if supposed to be used in a high temperature environment of 60° C. or higher. This is because excessive reduction of the maximum battery voltage not only leads to significant drop of the discharge capacity, but is small in effect of enhancing cycle characteristics, and hence it is not so effective.

Herein, explanation will be given to a case where, the nonaqueous electrolyte battery has been charged to a certain degree, the ambient temperature is elevated, and the battery voltage exceeds the maximum battery voltage $E_{max}$ which is calculated from a new ambient temperature and the formula (1-1).

In this case, it is preferred to continue to discharge excessive electricity until reaching the maximum battery voltage defined by the ambient temperature. Hence, storage characteristics in high temperature environment can be enhanced.

At this time, to accumulate the discharged electricity, an accumulating element such as a capacitor or other nonaqueous electrolyte batteries may be used. Further, to effectively use the electricity accumulated in the accumulating element, it is desired to provide a charge circuit to the nonaqueous electrolyte battery from the accumulating element or a discharge circuit to a load.

More specifically, the voltage and charging amount controller 36 determines the maximum battery voltage $E_{max}$ on the basis of the signals S6 and S8 and the above formulas (1-1) to (1-4) and performs control. The signal S6 is a detected temperature signal to be inputted in the controller 36 from the temperature detector 10 (signal obtained by detecting the ambient temperature of the unit 20). The signal S8 is a voltage detection signal to be inputted in the voltage and charging amount controller 36 from the voltage detector 34.

Control means about the maximum battery voltage may be attached to the nonaqueous electrolyte battery, or installed in a charger of the nonaqueous electrolyte battery. The former is preferred when desired to discharge excessive electricity sequentially.

Control relating the maximum battery voltage is specifically executed by the voltage calculator 31 and the controller 35 while the unit 20 is charging, and the controller 36 of the protective circuit 30 while the unit 20 is in the state of storage. The voltage and charging amount controller 36 determines the maximum battery voltage and the maximum charging amount from the temperature detection signal S6, charge accumulation amount signal S7, and voltage detection signal S8, and sends a signal S9 to the switch circuit 37. According to this signal S9, discharge from the nonaqueous electrolyte battery unit 20 is accumulated in the capacitor 38, and the maximum battery voltage $E_{max}$ is lowered.

Control means about the maximum battery voltage is specifically an IC chip or the like having the controller group mounted thereon. The IC chip and thermocouple (temperature detector) 10 are connected by way of an electric circuit. The IC chip can obtain information of ambient temperature detected by the thermocouple 10 through this electric circuit. Using the environmental temperature, the IC chip determines the maximum battery voltage $E_{max}$ as mentioned above. Thereafter, information of the maximum battery voltage is transmitted from the IC chip to another IC chip for controlling charge and discharge of the nonaqueous electrolyte, and the maximum battery voltage $E_{max}$ can be controlled.

Meanwhile, the IC chip may also control about a maximum charging amount described below at the same time. That is, one IC chip may be control means about the maximum battery voltage and control means about the maximum charging amount at the same time. In addition, the IC chip may further incorporate means for controlling charge and discharge of the nonaqueous electrolyte.

(Control Means about Maximum Charging Amount; Second Control Means)

Control means about the maximum charging amount controls the maximum charging amount $Q_{max}$ of the nonaqueous electrolyte battery unit (nonaqueous electrolyte battery or battery module) at a constant value, or lowers the maximum charging amount $Q_{max}$ when the detected temperature T exceeds the standard ambient temperature $T_{std}$.

In the nonaqueous electrolyte battery of an ionic liquid system 11, the charging amount is increased as a result of the behavior along with ambient temperature changes mentioned above. Therefore, by the control of maximum battery voltage $E_{max}$ only, the potential of positive and negative electrodes and state of charge cannot be controlled effectively. By controlling the maximum charging amount $Q_{max}$ in addition to the above control of the maximum battery voltage $E_{max}$, the electrode potential and state of charge and state of discharge of the anode and cathode active materials can be controlled, and the cycle performances can be enhanced. When the environmental temperature increases from 25° C. to 60° C., the charging amount is increased by about 1 to 5%. Therefore, only by controlling constant the maximum charging amount $Q_{max}$, the cycle performances can be enhanced.

The standard maximum charging amount $Q_{std}$ is a maximum charging amount at a standard temperature (standard ambient temperature) at which the nonaqueous electrolyte battery is assumed to be used. Usually, the standard ambient temperature is room temperature, and is set at not lower than 20° C. and not higher than 30° C. In particularly, it is often set at 20° C. or 25° C.

The standard maximum charging amount $Q_{std}$ is often equivalent to a so-called nominal capacity specified in catalogue, etc. At the standard ambient temperature, the standard maximum charging amount $Q_{std}$ can be determined by actually charging by a standard charging method for a nonaqueous electrolyte battery.

If the nonaqueous electrolyte battery deteriorates as a result of repeated cycles of charge and discharge, charging may be stopped when reaching total charging time or terminal current depending on the charging method at below the maximum charging amount $Q_{max}$.

Specifically, the maximum charging amount $Q_{max}$ is controlled by the charge and discharge controller 35 on the basis of input signals S4, S5, S10 and S11 and the following formulas (2-1) to (2-4). The signal S4 is a charging amount signal to be inputted in the charge and discharge controller 35 from the charging amount calculator 32. The signal S5 is a current detection signal of the unit 20 to be inputted in the charge and discharge controller 35 from the current detector 33. The signal S10 is a voltage detection signal of the unit 20 to be inputted in the charge and discharge controller 35 from the voltage detector 34. The signal S11 is a temperature signal to be imputed in the controller 35:

$$Q_{max} = Q_{std}\{1 - \beta(T - T_{std})\} \quad (2\text{-}1)$$

$$T_{std} \leq T \leq 150 \quad (2\text{-}2)$$

$$20 \leq T_{std} \leq 30 \quad (2\text{-}3)$$

$$0 \leq \beta \leq 0.001 \quad (2\text{-}4)$$

where $Q_{max}$ denotes a maximum charging amount (Ah); $Q_{std}$ denotes a standard maximum charging amount (Ah); T denotes a detected temperature (° C.); $T_{std}$ denotes a standard ambient temperature (° C.); and β denotes a coefficient.

An optimum maximum charging amount varies with various elements, such as types of cathode and anode active materials, an electrode composition of a filler and conductive aid, electrode filling density, a material and porosity of a separator, type of an ionic liquid, and alkaline metal salt or alkaline earth metal salt concentration. Generally, sufficient effects are obtained when the maximum charging amount is controlled by the formulas (2-1) to (2-4).

Along with elevation of temperature, the charging amount increases by charging not controlling the capacity by drop of viscosity of an ionic liquid electrolyte. Accordingly, the charging amount is controlled when the coefficient β is zero, that is, the charging amount is kept constant regardless of temperature changes (constant current charge control). On the other hand, if the coefficient β exceeds 0.001, the charging capacity drop by control is large, and consequently, the discharge capacity is lowered. Hence, in the invention, the coefficient β is in a range from zero to 0.001.

Most preferably, the coefficient β is zero. As a result, both cycle performances and discharge capacity are satisfied. Besides, the control is easier because the maximum charging amount is not changed and remains constant regardless of ambient temperature.

In the formula (2-1), the maximum charging amount $Q_{max}$ is defined by the current capacity (Ah) as the product of current and time, but it may be also defined by the electric power capacity (Wh) as the product of current capacity and voltage.

Herein, explanation will be given to a case where the nonaqueous electrolyte battery has been charged to a certain degree, the ambient temperature is elevated, and the battery voltage exceeds the maximum charging amount $Q_{max}$ which is obtained from a new ambient temperature and the formula (2-1).

In this case, it is preferred to continue to discharge excessive electricity until reaching the maximum charging amount $Q_{max}$ defined by the ambient temperature. Hence, excellent storage characteristics in a high temperature environment can be obtained.

At this time, to accumulate the discharged electricity, an accumulating element such as a capacitor 38 or other nonaqueous electrolyte batteries unit (not shown) may be used. Further, to effectively use the electricity accumulated in the accumulating element, it is desired to provide a charge circuit to a nonaqueous electrolyte battery from the accumulator element or a discharge circuit to a load.

More specifically, the voltage and charging amount controller 36 determines the maximum charging amount $Q_{max}$ on the basis of the signals S6, S7 and S8 and the above formulas (2-1) to (2-4) and performs control. The signal S6 is a detected temperature signal to be inputted in the controller 36 from the temperature detector 10 (signal obtained by detecting the ambient temperature of the unit 20). The signal S7 is a charging amount signal to be inputted in the voltage and charging amount controller 36 from the charging amount calculator 32. The signal S8 is a voltage detection signal of the unit 20 to be inputted in the voltage and charging amount controller 36 from the voltage detector 34.

Control relating to the maximum charging amount is specifically realized by the charge and discharge controller 35 and the voltage and charging amount controller 36 of the protective circuit 30. The control means about the maximum charging amount is specifically an IC chip or the like having the controller group of the protective circuit 30 mounted thereon. The IC chip and thermocouple (temperature detector) 10 are connected by way of an electric circuit. The IC chip can obtain information of ambient temperature detected by the thermocouple 10 through this electric circuit. Using this ambient temperature, the IC chip determines the maximum charging amount $Q_{max}$ as mentioned above. Thereafter, information of the maximum charging amount is transmitted from the IC chip to another IC chip for controlling charge and discharge of the nonaqueous electrolyte, and the maximum charging amount $Q_{max}$ can be controlled.

Meanwhile, the IC chip may also control the maximum battery voltage, described above, at the same time. That is, one IC chip may be control means of the maximum battery voltage and control means of the maximum charging amount at the same time. In addition, the IC chip may further incorporate means for controlling charge and discharge of the nonaqueous electrolyte.

<Temperature Detector>

The ambient temperature refers to a temperature of an atmosphere in which a nonaqueous electrolyte battery or battery module is installed.

In the nonaqueous electrolyte battery of an organic solvent system, the upper limit of the ambient temperature is about 60° C. due to evaporation or vaporization of the organic solvent. In the nonaqueous electrolyte battery of an ionic liquid system, on the other hand, it is usable up to 200° C. or 300° C. However, if the ambient temperature exceeds 200° C., a battery armoring member or base material supporting a battery may be influenced by temperature, and the battery characteristics deteriorate, or the battery cannot be used, and hence it is preferred to use it at 200° C. or lower.

When using a separator having a softening point at 200° C. or lower, such as a polyethylene system, polyethylene terephthalate system or polypropylene system, the ambient temperature is preferably 150° C. or lower.

The ambient temperature detector is specifically a thermocouple or the like. The location of the ambient temperature detector is not specified, as long as the temperature of the surrounding atmosphere of the nonaqueous electrolyte battery can be detected. However, if the ambient temperature detector is directly mounted on a battery armor, it may have an effect of heat generation of the battery itself. For this reason, it is preferable to install the ambient temperature detector in a circuit for controlling charging and discharging of the battery, or in a protective circuit or the like. However, in a special case, such as when temperature rise by heat generation of the nonaqueous electrolyte battery is small or when it is assumed to be used at lower than 60° C., the temperature of an outer wall of a container of the nonaqueous electrolyte battery may be detected. Or, the temperature may be predicted from the temperature of the container outer wall.

<Nonaqueous Electrolyte Battery Unit>

Referring to an example of a coin type battery, the nonaqueous electrolyte battery will be explained with reference to FIG. 1.

As shown in FIG. 1, a positive electrode 1, a separator 3, and a negative electrode 2 are laminated, and contained in an upper part 4 and a lower part 5 of a coin type battery container. The upper part 4 and lower part 5 of the coin type battery container are filled with a nonaqueous electrolyte. A gasket 6 having an electric insulating property is inserted between the upper part 4 and lower part 5 of the coin type battery container. The upper part 4 of the coin type battery container serves as a negative electrode terminal while the lower part 5 of the coin type battery container serves as a positive electrode terminal. Although not shown in the drawing, gaps in the separator 3, positive electrode 1 and negative electrode 2 are impregnated with a nonaqueous electrolyte.

Now, the positive electrode 1, negative electrode 2, nonaqueous electrolyte, separator 3, battery containers 4, 5, and gasket 6 will be specifically described.

<Positive Electrode>

The positive electrode 1 contains a cathode active material, and further contains an electroconductive substance such as carbon, a binder for forming in a sheet or pellet shape. A base material such as an electroconductive metal may be used as a current collector, and the positive electrode may be used in contact with the current collector.

The cathode active material is a positive electrode containing lithium composite oxide having at least one of cobalt, manganese and nickel, and is capable of intercalating and deintercalating alkaline metal ions such as lithium and sodium, and alkaline earth metal ions such as calcium.

In order to obtain a large battery capacity, it is preferred to select a metal oxide capable of intercalating and deintercalating lithium ions of small weight per charge, and various oxides can be used as the cathode active material, for example, chalcogen compounds such as a lithium-containing cobalt composite oxide, lithium-containing nickel cobalt composite oxide, lithium-containing nickel composite oxide, and lithium manganese composite oxide.

Above all, oxides having a charging and discharging potential of 3.8 V or higher and lithium metal potential are preferred because a high battery capacity is realized, and examples thereof include lithium-containing cobalt composite oxide, lithium-containing nickel cobalt composite oxide, and lithium-containing manganese composite oxide. A cathode compound represented by the formula $LiCo_xNi_yMn_zO_2$ ($x+y+z=1$, $0<x\leq0.5$, $0\leq y<1$, $0\leq z<1$) is particularly preferred because the decomposition reaction of an ionic liquid on the positive electrode surface at room temperature or higher can be suppressed.

As a conductive material, an electroconductive substance such as carbon and metal can be used. Powder or fibrous powder is preferred as shape.

Examples of the binder include polytetrafluoroethylene (PTFE), polyvinylidene fluoride (PVdF), ethyle-propylene-diene copolymer, styrene-butadiene rubber, etc.

As the current collector, metal foil, aluminum plate or mesh, stainless steel, titanium or the like can be used.

The cathode active material and conductive material are formed into pellets or a sheet, together with a binder, by kneading or rolling. Or, they may be dissolved and suspended in a solvent such as toluene or N-methyl pyrrolidone (NMP) to be formed into a slurry, which may be applied and dried on the current collector to form a sheet.

<Negative Electrode>

The negative electrode 2 contains an anode active material, and is formed into pellets, foil or sheet, together with a conductive material and binder.

Like the positive electrode, the anode active material is capable of intercalating and deintercalating alkaline metal ions such as lithium and sodium, and alkaline earth metal ions such as calcium, at a baser potential than in the positive electrode to be combined. It is preferred to select a material capable of intercalating and deintercalating lithium ions since a larger battery capacity can be obtained.

Examples having such characteristics include lithium metal, a carbonaceous material such as artificial and natural graphite, non-graphitizable carbon, and easily graphitizable normally baked carbon, lithium titanate, iron sulfide, cobalt oxide, lithium aluminum alloy, and tin oxide.

An example of a more preferable active material is one of which the working potential of the negative electrode is nobler than the potential of metal lithium by 0.5 V or more. By selecting such active material, deterioration due to secondary reaction of an ionic liquid on the surface of the anode active material can be suppressed. From this point of view, lithium titanate and iron sulfide are most preferable as the anode active material. A spinel structure is particularly preferable for lithium titanate. Further, two or more active materials can be mixed. Scaly, fibrous, spherical and other shapes may be formed.

Examples of the conductive material include an electroconductive substance such as carbon and metal. Powder or fibrous powder is preferred as shape.

Examples of the binder include polytetrafluoroethylene (PTFE), polyvinylidene fluoride (PVdF), styrene-butadiene rubber, carboxy methyl cellulose (CMC), etc. As the current collector, a metal foil, copper plate or mesh, stainless steel, nickel or the like can be used.

The anode active material and conductive material are formed into pellets or a sheet, together with a binder, by kneading or rolling. Or, they may be dissolved and suspended in a solvent such as water or N-methyl pyrrolidone (NMP) to be formed into a slurry, which may be applied and dried on the current collector to form a sheet.

<Nonaqueous Electrolyte>

The nonaqueous electrolyte contains an ionic liquid, and an alkaline metal salt or alkaline earth metal salt.

The ionic liquid is an organic salt composed of organic cations and anions, and is especially a salt at least partly in a liquid phase at ordinary temperature. It also includes a salt presenting a liquid state at ordinary temperature that includes a salt not in a liquid state at ordinary temperature, such as lithium tetrafluoroborate. An organic matter cation generally has a quaternary ammonium skeleton.

The cation material forming an ionic liquid is not particularly limited, and examples thereof include aromatic quaternary ammonium ions such as 1-ethyl-3-methyl imidazolium, 1-methyl-3-propyl imidazolium, 1-methyl-3-isopropyl imidazolium, 1-butyl-3-methyl imidazolium, 1-ethyl-2,3-dimethyl imidazolium, 1-ethyl-3,4-dimethyl imidazolium, N-propyl pyridinium, N-butyl pyridinium, N-tert-butyl pyridinium, N-tert-pentyl pyridinium; and aliphatic quaternary ammonium ions such as N-butyl-N,N,N-trimethyl ammonium, N-ethyl-N,N-dimethyl-N-propyl ammonium, N-butyl-N-ethyl-N,N-dimethyl ammonium, N-butyl-N,N-dimethyl-N-propyl ammonium, N-methyl-N-propyl pyrrolidinium ion, N-butyl-N-methyl pyrrolidinium ion, N-methyl-N-pentyl pyrrolidinium, N-propoxy ethyl-N-methyl pyrrolidinium, N-methyl-N-propyl piperidinium, N-methyl-N-isopropyl piperidinium, N-butyl-N-methyl piperidinium, N-isobutyl-N-methyl piperidinium, N-sec-butyl-N-methyl piperidinium, N-methoxy ethyl-N-methyl piperidinium, and N-ethoxy ethyl-N-methyl piperidinium, which may be used either alone or in combination of two or more types.

Among the aliphatic quaternary ammonium ions, a nitrogen-containing five-membered ring pyrrolidinium ion, and a nitrogen-containing six-membered ring piperidinium ion are preferred because they are high in resistance to reduction, and excellent in storage property and cycle performance by suppression of a secondary reaction.

By using a cation having the imidazolium structure of an aromatic quaternary ammonium ion, an ionic liquid of low viscosity can be obtained, and when used as an electrolyte, a high battery output characteristic is obtained, which is preferable. Further, when an active material with a working potential nobler than a metal lithium potential by 0.5 V or higher is used as a negative electrode, a secondary reaction on the negative electrode can be suppressed even by an ionic liquid containing a cation having the imidazolium structure, and a nonaqueous electrolyte battery excellent in storage property and cycle performance can be obtained.

An anion for forming an ionic liquid is not particularly limited, and examples thereof include tetrafluoroboric acid anion ($BF_4^-$), hexafluorophosphoric acid anion ($PF_6^-$), hexafluoromethane sulfonic acid anion, bistrifluoromethane sulfonyl amide anion (TFSI), and dicyanamide anion (DCA), which may be used either alone or in combination of two or more types.

Examples of the alkaline metal salt include a lithium salt and a sodium salt, and examples of the alkaline earth metal salt include a calcium salt. A lithium salt is particularly preferred because a larger battery capacity is obtained.

Examples of the lithium salt include lithium tetrafluoroborate ($LiBF_4$), lithium hexafluorophosphorate ($LiPF_6$), lithium hexafluoromethane sulfonate, lithium bistrifluoromethane sulfonyl amide (LiTFSI), lithium bispentafluoroethane sulfonyl amide (LiBETI) and dicyanamide (LiDCI), which may be used either alone or in combination of two or more types. For enhancing characteristics at relatively high temperature of, for example, 60° C., the alkaline metal salt is also preferred to have the same anion seed as the anion of the ionic liquid.

The concentration of the alkaline metal salt or alkaline earth metal salt is preferably 0.1 to 2.5 mol/L. If lower than 0.1 mol/L, sufficient ion conductivity is not obtained, and thus, the discharge capacity is lowered. If exceeding 2.5 mol/L, the viscosity of the ionic liquid hikes, so that the property of impregnation into cathode and anode active materials is lowered, and the discharge capacity is also lowered. From the viewpoint of maximizing the viscosity and the absolute number of ions around room temperature, a more preferred range of the concentration is in a range of 0.5 to 2.3 mol/L.

The nonaqueous electrolyte is composed of one or more types of ionic liquid, and one or more types of alkaline metal salt. To maximize the flame retardance, it is preferred not to include an organic solvent. Specifically, the proportion of the ionic liquid in the nonaqueous electrolyte is not lower than 50 wt. %, and more preferably not lower than 70 wt. %.

The proportion of the organic solvent other than the ionic liquid and alkaline metal salt is not more than 5 wt. %, and more preferably not more than 1 wt. % when used at 70° C. or higher in order to minimize the volatile content.

However, other organic solvents may be contained in order to suppress a secondary reaction in the battery or enhance the affinity for the separator and the like. In such a case, the content is desired to be 5 wt. % or less in order to assure flame retardance. In addition, when other organic solvents are added in order to suppress a secondary reaction or control the chemical reaction in the battery, it is preferred that not less than half of the addition is consumed after fabricating the battery or after the end of the initial charge and discharge, and the addition amount is desirably 3 wt. % or less, or a molar number corresponding to increment of an initial cycle addition reverse capacity by addition of the organic solvent.

<Separator>

The separator 3 may be made of, for example, synthetic resin unwoven cloth, polyethylene porous film, polypropylene porous film, cellulose porous sheet or the like. If use at over 150° C. is assumed, it is preferred to use glass as a separator.

<Battery Container>

The battery containers 4 and 5 may be of a coin type, made of stainless steel or iron. The upper part 5 and lower part 4 are crimped closed, with a gasket 6 interposed between them. In FIG. 1, a coin type nonaqueous electrolyte battery is shown, but the battery may be formed in other shapes, including a flat, square, cylindrical, button, sheet, or laminated shape. Note that the invention can be applied to not only a small battery for use in a portable electronic appliance or the like, but also a larger battery for use in an automobile or motorbike.

<Gasket>

The gasket 6 may be made of polypropylene, polyethylene, vinyl chloride, polycarbonate, polytetrafluoroethylene (PTFE), etc.

Now, a battery pack containing a battery module will be explained. The battery module is composed of the above-described nonaqueous electrolyte batteries (unit cells) arranged in series or parallel.

FIG. 2 is an exploded perspective view of the battery pack.

As shown in FIG. 2, eight flat unit cells 11 are laminated in the thickness direction, and a battery module 20 is formed like a box. In the individual unit cells 11, the positive electrode terminals 13 and negative electrode terminals 14 from the positive electrodes negative electrodes are drawn outside the armor as described above. A printed wiring board 12 is arranged at the side from which the positive electrode terminals 13 and negative electrode terminals 14 protrude.

The positive electrode terminals 13 are electrically connected to a positive electrode side connector 16 through a positive electrode side wiring 15. The negative electrode terminals 14 are electrically connected to a negative electrode side connector 18 through a positive electrode side wiring 17. The positive electrode side and negative electrode side connectors 16 and 18 are connected to the opposite side connectors mounted on the printed wiring board 12.

The battery module 20 is fixed by an adhesive tape 19. In the battery module 20, a protective sheet 21 made of rubber or resin is arranged on three sides, other than the side from which the positive electrode terminals 13 and negative electrode terminals 14 protrude. A protective block 22 made of rubber or resin is arranged between the side from which the positive electrode terminals 13 and negative electrode terminals 14 protrude and the printed wiring board 12.

The battery module 20 is housed in a container 23 together with the protective sheets 21, protective block 22 and printed wiring board 12. A lid 24 is attached on the top of the container 23.

The configuration will be specifically described below.

The printed wiring board 12 has a thermocouple 10 for measuring the ambient temperature, a protective circuit 30, and terminals for power distribution to an external device 50 (see FIG. 3).

The thermocouple 10 may be also mounted on the protective block 22 or container 23, instead of the printed wiring board 12, or may be installed on a device containing the battery pack although not shown in the drawing. In this battery pack, the thermocouple 10 serves as temperature detecting means, and the ambient temperature can be measured by use of the thermocouple.

The protective circuit 30 includes control means for controlling the maximum battery voltage, and control means for controlling the maximum charging amount. On the basis of the signal carrying information of an ambient temperature received from the thermocouple 10, the means controls the unit cells 11 or the entire battery module 20.

Generally, the battery module is varied in electrode capacity among the individual unit cells 11, and therefore is likely to vary in charge voltage or charging amount. For this reason, the control of the maximum battery voltage and control of the maximum charging amount are particularly effective in the battery module.

Instead of the adhesive tape 19, a heat shrink tape may be used. In this case, the protective sheets 21 are arranged at both sides of the battery module 20, a heat shrink tape is turned around, and then, the heat shrink tube is heated and shrunk to bundle the battery module 20.

The unit cells 11 shown in FIG. 2 are connected in series, but may be connected in parallel for increasing the capacity of the battery pack. Of course, the assembled battery packs may be connected in series or in parallel.

Modes of the battery pack may be varied depending on applications.

Battery packs are preferably used in high temperature applications. Specific examples thereof include two-wheel or four-wheel hybrid electric cars, two-wheel or four-wheel electric cars, power-assisted bicycles, and other vehicles.

EXAMPLES

Examples will be given below, but the invention is not limited to these examples, and may be changed and modified within a scope not departing from the true spirit thereof.

Examples 1 to 15 and Comparative Examples 1 to 6

A cathode active material was prepared by using 90 wt. % of lithium cobalt oxide ($Li_2CoO_1$) powder, 2 wt. % of acetylene black, 3 wt. % of graphite, and 5 wt. % of polyvinylidene fluoride as a binder, the resultant was dissolved in N-methyl pyrrolidone as a solvent to form slurry, and the slurry was applied on an aluminum foil of 20 μm in thickness, dried and rolled. The obtained positive electrode sheet was cut out in a circle of 15 mm in diameter, and a positive electrode 1 was manufactured.

An anode active material was prepared by using 90 wt. % of $Li_4/3Ti_5/3O_4$ powder, 5 wt. % of artificial graphite, and 5 wt. % of polyvinylidene fluoride (PVdF), the resultant was mixed and dissolved in N-methyl pyrrolidone (NMP) as a solvent, and the obtained slurry was applied on an aluminum foil of 20 μm in thickness, dried and rolled. The obtained negative electrode sheet was cut out in a circle of 16 mm in diameter, and a negative electrode 2 was manufactured.

Polypropylene unwoven fabric was used as a separator 3.

A nonaqueous electrolyte was prepared by dissolving 1.5 mol/L of lithium tetrafluoroborate ($LiBF_4$) in tetrafluoroboric acid and 1-ethyl-methyl imidazolium (EMI•$BF_4$).

The positive electrode 1, separator 3, and negative electrode 2 were laminated in this sequence on a coin type battery container (lower part) 4, and the nonaqueous electrolyte was added and impregnated in vacuum. Thereafter, a coin type battery container (upper part) 5 was fixed by way of a gasket 6, and closed by crimping to fabricate a coin type nonaqueous secondary battery.

Comparative Examples 7 and 8

A coin type nonaqueous secondary battery was fabricated in the same manner as in the foregoing examples, except that the nonaqueous electrolyte was prepared by dissolving 1.5 mol/L of lithium tetrafluoroborate ($LiBF_4$) in ethylene carbonate and methyl carbonate (by ratio of 1:1 by volume).

(Cycle Test)

A cyclic test was conducted for Examples 1 to 15 and Comparative examples 1 to 8.

A standard maximum battery voltage was set at 2.8 V. First, charging and discharging were tested in 3 cycles at room temperature (25° C.). Charging consisted of a constant current and constant voltage (CCCV charge) at 0.6 mA and 2.8 V, and charging was stopped when 0.003 mA in the CV charge mode was reached, or after a total charging time of 5 hours. Discharging was performed at 0.6 mA and stopped at a terminal battery voltage of 1.5 V. The discharge capacity in the third cycle was defined as the standard maximum charging amount.

At and after the fourth cycle, the maximum battery voltage and the maximum charging amount were controlled or not as shown in Table 1. When the maximum battery voltage and the maximum charging amount were controlled, the values of coefficients α and β in formulas (1) and (2) were defined as shown in Table 1. The ambient temperature was set at 25° C., 60° C. or 80° C. At 25° C. and 60° C., the test was repeated for 50 cycles (a total of 53 cycles), and at 80° C., the test was repeated for 20 cycles (a total of 23 cycles). On the basis of the discharge amount at the fourth cycle, the discharge capacity retention rate at the 53rd cycle and the 23rd cycle was calculated. Results are shown in Table 1.

Charging at and after the fourth cycle consisted of a constant current and constant voltage charge (CCCV charge) at 0.6 mA and 2.8 V. After reaching the maximum battery voltage calculated by using coefficient α of Table 1 from formula (2), the charging was changed to the CV charge mode. Charging was stopped when the maximum charging capacity was reached, calculated by using coefficient β of Table 1 from formula (3), or the total charging time of 5 hours. Discharging was performed at 0.6 mA and stopped at a terminal battery voltage of 1.5 V.

example 7 at the ambient temperature of 60° C., the cycle performance is inferior as compared with any example. In Comparative example 8 at the ambient temperature of 80° C., the contact with the battery is broken by elevation of the internal pressure before reaching 20 cycles, and the capacity cannot be measured.

As described herein, the invention provides a charge accumulating system excellent in cycle performances at higher temperature than room temperature.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A charge accumulating system comprising:
   a nonaqueous electrolyte battery unit including a nonaqueous electrolyte containing an ionic liquid, a negative electrode and a positive electrode;
   a temperature detector which detects an ambient temperature of the nonaqueous electrolyte battery unit;

TABLE 1

|  | Maximum battery voltage | α | Maximum charging amount | β | Ambient temperature(° C.) | Charge amount at third cycle (mAh) | Charge amount at fourth cycle (mAh) | Discharge capacity maintenance rate (%) |
|---|---|---|---|---|---|---|---|---|
| Example 1 | Controlled | 0.001 | Controlled | 0 | 25 | 1.08 | 1.08 | 90.1 |
| Example 2 | Controlled | 0.001 | Controlled | 0 | 60 | 1.06 | 1.06 | 75.9 |
| Example 3 | Controlled | 0.001 | Controlled | 0 | 80 | 1.08 | 1.08 | 59.7 |
| Example 4 | Controlled | 0.001 | Controlled | 0.0003 | 25 | 1.06 | 1.06 | 89.9 |
| Example 5 | Controlled | 0.001 | Controlled | 0.0003 | 60 | 1.07 | 1.06 | 80.3 |
| Example 6 | Controlled | 0.001 | Controlled | 0.0003 | 80 | 1.07 | 1.05 | 67.1 |
| Example 7 | Controlled | 0.001 | Controlled | 0.001 | 25 | 1.06 | 1.06 | 90.3 |
| Example 8 | Controlled | 0.001 | Controlled | 0.001 | 60 | 1.06 | 1.02 | 85.1 |
| Example 9 | Controlled | 0.001 | Controlled | 0.001 | 80 | 1.07 | 1.01 | 72.1 |
| Example 10 | Controlled | 0.002 | Controlled | 0 | 25 | 1.06 | 1.06 | 89.8 |
| Example 11 | Controlled | 0.002 | Controlled | 0 | 60 | 1.05 | 1.05 | 84.8 |
| Example 12 | Controlled | 0.002 | Controlled | 0 | 80 | 1.07 | 10.7 | 73.5 |
| Example 13 | Controlled | 0.004 | Controlled | 0 | 25 | 1.07 | 1.07 | 90.0 |
| Example 14 | Controlled | 0.004 | Controlled | 0 | 60 | 1.06 | 0.98 | 82.3 |
| Example 15 | Controlled | 0.004 | Controlled | 0 | 80 | 1.07 | 0.93 | 69.9 |
| Comparative example 1 | Not controlled | 0 | Not controlled | — | 60 | 1.08 | 1.09 | 45.3 |
| Comparative example 2 | Not controlled | 0 | Not controlled | — | 80 | 1.06 | 1.11 | 21.9 |
| Comparative example 3 | Not controlled | 0 | Controlled | 0 | 60 | 1.06 | 1.06 | 60.6 |
| Comparative example 4 | Not controlled | 0 | Controlled | 0 | 80 | 1.06 | 1.06 | 43.5 |
| Comparative example 5 | Controlled | 0.001 | Not controlled | — | 60 | 1.07 | 1.09 | 51.9 |
| Comparative example 6 | Controlled | 0.001 | Not controlled | — | 80 | 1.06 | 1.11 | 37.2 |
| Comparative example 7 | Controlled | 0.001 | Controlled | 0 | 60 | 1.08 | 1.07 | 55.1 |
| Comparative example 8 | Controlled | 0.001 | Controlled | 0 | 80 | 1.08 | 1.07 | n/a |

As shown in Table 1, Examples 1 to 15 are higher in discharge capacity retention rate than in Comparative examples 1 to 8. Therefore, the charge accumulating system of the invention is known to be excellent in cycle characteristics in the high temperature environment.

The nonaqueous electrolyte battery of an organic electrolytic solution system will now be described. In Comparative first control means for lowering a maximum battery voltage $E_{max}$ of the nonaqueous electrolyte battery unit when the detected temperature T from the temperature detector exceeds a standard ambient temperature $T_{std}$, the maximum battery voltage being controlled according to the following formulas:

$$E_{max} = E_{std} - \alpha(T - T_{std})$$

$T_{std} \leq T \leq 150$ $20 \leq T_{std} \leq 30$ $0.001 \leq \alpha \leq 0.004$ wherein $E_{max}$ denotes a maximum battery voltage (V); $E_{std}$ denotes a standard maximum battery voltage (V); T denotes a detected temperature (° C.); $T_{std}$ denotes a standard ambient temperature (° C.); and α denotes a coefficient; and second control means for controlling a maximum charging amount $Q_{max}$ of the nonaqueous electrolyte battery unit at a constant level when the battery temperature is below the standard ambient temperature $T_{std}$ and lowering the maximum charging amount when the detected temperature T from the temperature detector exceeds the standard ambient temperature $T_{std}$, wherein the maximum charging amount $Q_{max}$ is controlled according to the following formulas:

$Q_{max} = Q_{std}\{1 - \beta(T - T_{std})\}$ $T_{std} \leq T \leq 150$ $20 \leq T_{std} \leq 30$ $0 \leq \beta \leq 0.001$ where $Q_{max}$ denotes a maximum charging amount (Ah); $Q_{std}$ denotes a standard maximum charging amount (Ah); and β denotes a coefficient.

2. The system according to claim 1, wherein the ionic liquid contains a cation having an imidazolium structure.

3. The system according to claim 1, wherein the nonaqueous electrolyte battery unit is a battery module having a plurality of nonaqueous electrolyte batteries.

4. The system according to claim 1, further comprising:
a detector which detects a voltage of the nonaqueous electrolyte battery unit;
a voltage and charging amount controller;
a switch circuit provided in a discharge circuit connected to the nonaqueous electrolyte battery unit; and
an accumulating element provided in the discharge circuit,
wherein the voltage and charging amount controller opens the switch circuit on the basis of the detected voltage from the voltage detector and charges the accumulating element from the nonaqueous electrolyte battery unit.

5. The system according to claim 1, further comprising:
a current detector which detects a current of nonaqueous electrolyte battery unit;
a voltage and charging amount controller;
a charging amount calculator which integrates current values on the basis of the detected current from the current detector, calculates a charging amount necessary for the nonaqueous electrolyte battery unit, and sends the calculated charging amount to the voltage and charging amount controller;
a switch circuit provided in a discharge circuit connected to the nonaqueous electrolyte battery unit; and
an accumulating element provided in the discharge circuit,
wherein the charging amount controller opens the switch circuit on the basis of the charging amount from the charging amount calculator, and discharges from the nonaqueous electrolyte battery unit to the accumulating element.

6. A charge accumulating method comprising:
detecting an ambient temperature of the nonaqueous electrolyte battery unit; the nonaqueous electrolyte battery unit including a nonaqueous electrolyte containing an ionic liquid, a negative electrode and a positive electrode;
lowering a maximum battery voltage $E_{max}$ of the nonaqueous electrolyte battery unit when a detected temperature T exceeds a standard ambient temperature $T_{std}$, the maximum battery voltage being controlled according to the following formulas:

$E_{max} = E_{std} - \alpha(T - T_{std})$ $T_{std} \leq T \leq 150$ $20 \leq T_{std} \leq 30$ $0.001 \leq \alpha \leq 0.004$ wherein $E_{max}$ denotes a maximum battery voltage (V); $E_{std}$ denotes a standard maximum battery voltage (V); T denotes a detected temperature (° C.); $T_{std}$ denotes a standard ambient temperature (° C.); and α denotes a coefficient; and controlling a maximum charging amount $Q_{max}$ of the nonaqueous electrolyte battery unit at a constant level when the battery temperature is below the standard ambient temperature $T_{std}$ and lowering the maximum charging amount when the detected temperature T exceeds the standard ambient temperature $T_{std}$, wherein the maximum charging amount $Q_{max}$ is controlled according to the following formulas:

$Q_{max} = Q_{std}\{1 - \beta(T - T_{std})\}$ $T_{std} \leq T \leq 150$ $20 \leq T_{std} \leq 30$ $0 \leq \beta \leq 0.001$ where $Q_{max}$ denotes a maximum charging amount (Ah); $Q_{std}$ denotes a standard maximum charging amount (Ah); and β denotes a coefficient.

7. The method according to claim 6, further comprising:
detecting a voltage of the nonaqueous electrolyte battery unit;
opening a switch circuit of a discharge circuit on the basis of the detected voltage, the switch circuit being connected to the nonaqueous electrolyte battery unit, and
discharging from the nonaqueous electrolyte battery unit to an accumulating element in the discharge circuit.

8. The method according to claim 6, further comprising:
detecting a current of the nonaqueous electrolyte battery unit;
integrating current values on the basis of the detected current, and calculating a charging amount necessary for the nonaqueous electrolyte battery unit;
opening a switch circuit of a discharge circuit on the basis of the charging amount, the switch being connected to the nonaqueous electrolyte battery unit, and
discharging from the nonaqueous electrolyte battery unit to an accumulating element in the discharge circuit.

* * * * *